United States Patent
Wu et al.

(10) Patent No.: US 11,765,305 B2
(45) Date of Patent: Sep. 19, 2023

(54) METHOD FOR PROCESSING IMAGE STORAGE MEDIUM AND APPARATUS FOR THE SAME

(71) Applicant: BOE TECHNOLOGY GROUP CO., LTD., Beijing (CN)

(72) Inventors: Yanhong Wu, Beijing (CN); Hanwen Liu, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 437 days.

(21) Appl. No.: 16/979,417

(22) PCT Filed: Dec. 19, 2019

(86) PCT No.: PCT/CN2019/126632
§ 371 (c)(1),
(2) Date: Sep. 9, 2020

(87) PCT Pub. No.: WO2021/120105
PCT Pub. Date: Jun. 24, 2021

(65) Prior Publication Data
US 2022/0394154 A1    Dec. 8, 2022
US 2023/0254434 A9    Aug. 10, 2023

(51) Int. Cl.
*H04N 1/60* (2006.01)
*H04N 1/56* (2006.01)
(Continued)

(52) U.S. Cl.
CPC ................... *H04N 1/6022* (2013.01)

(58) Field of Classification Search
CPC ........ G06T 11/001; G06T 11/60; G06T 11/80; G06T 11/40; G06T 2207/10024;
(Continued)

(56) References Cited

U.S. PATENT DOCUMENTS 11,300,793 B1 *    4/2022    Buckley ............... G02B 26/105
2003/0156752 A1 *   8/2003    Turpin ................. G06T 11/001
                                                            382/162
(Continued)

FOREIGN PATENT DOCUMENTS

CN    101261821 A    9/2008
CN    103310736 A    9/2013
(Continued)

OTHER PUBLICATIONS

Office action issued for Chinese application No. 201980003111.9, dated Jun. 6, 2022, 14 pages.
(Continued)

*Primary Examiner* — Wesner Sajous
(74) *Attorney, Agent, or Firm* — Dave Law Group LLC; Dr. Raj S. Dave

(57) ABSTRACT

An embodiment of the present disclosure provides a method for processing an image. The method comprise: determining weights corresponding to candidate colors for a target color based on an original color of a pixel in the image; selecting a target color of the pixel from the candidate colors based on the weights; and converting the original color of the pixel into the target color to obtain a target image. According to the embodiment of the present disclosure, by determining the weights of the candidate colors, the image can be converted into the target image comprising only the candidate colors, thereby using a limited number of candidate colors to represent the target image.

16 Claims, 3 Drawing Sheets

(51) Int. Cl.
*H04N 9/64* (2023.01)
*G09G 5/02* (2006.01)
*G09G 5/04* (2006.01)
*G09G 5/06* (2006.01)
*G06T 11/00* (2006.01)
*G06T 11/60* (2006.01)

(58) Field of Classification Search
CPC .. G06T 7/11; G06T 7/90; G06T 5/001; G09G 5/02; G09G 5/04; G09G 5/028; G09G 5/06; G09G 2320/066; H04N 1/60; H04N 1/6027; H04N 9/64; H04N 1/56; H04N 1/6058; H04N 1/6077; H04N 1/628
See application file for complete search history.

(56) References Cited

U.S. PATENT DOCUMENTS

| | | | |
|---|---|---|---|
| 2006/0187232 A1* | 8/2006 | Kempf | G09G 5/04 345/591 |
| 2007/0013649 A1 | 1/2007 | Kim et al. | |
| 2010/0097407 A1* | 4/2010 | Zulch | G09G 5/026 345/690 |
| 2012/0194537 A1 | 8/2012 | Huang | |
| 2014/0071174 A1 | 3/2014 | Kim et al. | |
| 2014/0092407 A1 | 4/2014 | Sawada | |
| 2014/0334728 A1 | 11/2014 | Wu et al. | |
| 2015/0055152 A1 | 2/2015 | Hasegawa | |
| 2016/0335943 A1 | 11/2016 | Ji | |
| 2017/0118382 A1* | 4/2017 | Sugita | H04N 1/6055 |
| 2018/0063381 A1* | 3/2018 | Takesue | H04N 1/603 |

FOREIGN PATENT DOCUMENTS

| | | | | |
|---|---|---|---|---|
| CN | 103339944 A | 10/2013 | | |
| CN | 105635574 B | 2/2019 | | |
| CN | 109658872 A | 4/2019 | | |
| CN | 110377860 | * 10/2019 | ........... G06F 16/958 |
| CN | 110377860 A | 10/2019 | | |
| CN | 110570380 A | 12/2019 | | |
| CN | 110689860 A | 1/2020 | | |
| KR | 1020070009015 A | 1/2007 | | |
| TW | I533661 B | 6/2016 | | |

OTHER PUBLICATIONS

Search report issued for EP Application No. 19945396.0, dated Jul. 12, 2022, 15 pages.
Examination report issued for Indian Application No. 202127051520, dated Aug. 19, 2022, 8 pages.
International Search Report and Written Opinion dated Sep. 2, 2020 for PCT Application No. PCT/CN2019/126632.
Jarvis, J.F. et al., "A Survey of Techniques for the Display of Continuous Tone Pictures on Bilevel Displays," Computer Graphics and Image Processing 5, Academic Press Inc., 1976, pp. 13-40.

* cited by examiner

| | | | | |
|---|---|---|---|---|
| | | | | |
| | | 110 | 112 | 114 |
| | | | 7/48 | 5/48 |
| 116 | 118 | 120 | 122 | 124 |
| 3/48 | 5/48 | 7/48 | 5/48 | 3/48 |
| 126 | 128 | 130 | 132 | 134 |
| 1/48 | 3/48 | 5/48 | 3/48 | 1/48 |

METHOD FOR PROCESSING IMAGE STORAGE MEDIUM AND APPARATUS FOR THE SAME

CROSS-REFERENCE TO RELATED APPLICATIONS

This application is the U.S. National Stage Entry of PCT/CN2019/126632, filed on Dec. 19, 2019, the entire disclosure of which is incorporated herein by reference as part of the disclosure of this application.

FIELD

The present disclosure relates to the field of image processing, and in particular, to a method for processing an image, a storage medium and an apparatus for the same.

BACKGROUND

In recent years, ink screens have been widely used in a display field. The ink screens are used in products such as e-books (for example, Amazon's kindle), e-paper, e-labels, and e-table cards. Unlike traditional LCD displays, the ink screens can only display few colors (for example, only black and white).

SUMMARY

Embodiments of the present disclosure provide a method for processing an image, a storage medium and an apparatus for the same.

In a first aspect of the present disclosure, a method for processing an image is provided. The method comprises: determining weights corresponding to candidate colors for a target color based on an original color of a pixel in the image; selecting a target color of the pixel from the candidate colors based on the weights; and converting the original color of the pixel into the target color to obtain a target image.

In an embodiment of the present disclosure, selecting a target color of the pixel comprises: determining a weight with a maximum value among the weights; and selecting the candidate color corresponding to the weight with the maximum value as the target color.

In an embodiment of the present disclosure, determining the weights comprises:

establishing a color conversion space in a HSV color space based on the candidate colors; in the color conversion space, determining the weights corresponding to the candidate colors.

In an embodiment of the present disclosure, the candidate colors comprise a color with a hue, white or black, and the weights comprise a first weight corresponding to the color with the hue, a second weight corresponding to white, and a third weight corresponding to black.

In an embodiment of the present disclosure, the color conversion space is established such that: when a S component and a V component are at maximum values, a H component has a plurality endpoints, the endpoints comprise a first endpoint and a second endpoint both representing white, a third endpoint representing the color with a hue, and an odd number of additional endpoints representing black or white, wherein the first endpoint and the second endpoint divide the H component as a whole into a first interval and a second interval continuous with each other, and the third endpoint is located in the first interval, the additional endpoints are located in the second interval, and when a number of the additional endpoint is 1, the additional endpoint represents black, and when a number of the additional endpoints is greater than 1, one of two closest additional endpoints represents white and the other of the two closest additional endpoints represents black, and two additional endpoints respectively closest to the first endpoint and the second endpoint represent black, wherein, a color between any two closest endpoints is a transition of colors of the two endpoints; as the S component gradually decreases, a color in the color conversion space gradually changes to white; and as the V component gradually decreases, a color in the color conversion space gradually changes to black.

In an embodiment of the present disclosure, determining the weights comprises: when the S component and the V component are at maximum values, determining first ratios of the candidate colors based on the H component, wherein a sum of the first ratios of the candidate colors is 1; determining second ratios of the candidate colors based on the first ratios and the S component, wherein a sum of the second ratios of the candidate colors is 1; and determining the weights of the candidate colors based on the second ratios and the V component, wherein a sum of the weights of the candidate color is 1.

In an embodiment of the present disclosure, a hue of the color with the hue in the HSV space is represented by the following formula:

$H = N \times 60°$, wherein, $N$ is an integer and $0 \leq N \leq 5$.

In an embodiment of the present disclosure, the endpoints comprise six endpoints, and H coordinates of the endpoints are 0°, 60°, 120°, 180°, 240°, 300°, respectively.

In an embodiment of the present disclosure, a hue of the color with the hue is 0°, wherein the first ratio $r_{11}$ corresponding to red, the first ratio $r_{21}$ corresponding to white, and the first ratio $r_{31}$ corresponding to black are expressed by the following formula:

$$\text{when } 0° \leq H < 60°,$$
$$r_{11} = 1 - \frac{H}{60°}, r_{21} = \frac{H}{60°}, r_{31} = 0,$$
$$\text{when } 60° \leq H < 120°,$$
$$r_{11} = 0, r_{21} = 1 - \frac{H - 60°}{60°}, r_{31} = \frac{H - 60°}{60°},$$
$$\text{when } 120° \leq H < 180°,$$
$$r_{11} = 0, r_{21} = \frac{H - 120°}{60°}, r_{31} = 1 - \frac{H - 120°}{60°},$$
$$\text{when } 180° \leq H < 240°,$$
$$r_{11} = 0, r_{21} = 1 - \frac{H - 180°}{60°}, r_{31} = \frac{H - 180°}{60°},$$
$$\text{when } 240° \leq H < 300°,$$
$$r_{11} = 0, r_{21} = 1 - \frac{H - 240°}{60°}, r_{31} = 1 - \frac{H - 240°}{60°},$$
$$\text{when } 300° \leq H < 360°,$$
$$r_{11} = \frac{H - 300°}{60°}, r_{21} = 1 - \frac{H - 300°}{60°}, r_{31} = 0;$$

wherein, the second ratio $r_{12}$ corresponding to red, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to red, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, a hue of the color with the hue is 60°, wherein the first ratio $r_{11}$ corresponding to yellow, the first ratio $r_{11}$ corresponding to white, and the first ratio $r_{31}$ corresponding to black are expressed by the following formula:

when $60° \le H < 120°$, $$r_{11} = 1 - \frac{H - 60°}{60°}, r_{21} = \frac{H - 60°}{60°}, r_{31} = 0,$$

when $120° \le H < 180°$, $$r_{11} = 0, r_{21} = 1 - \frac{H - 120°}{60°}, r_{31} = \frac{H - 120°}{60°},$$

when $180° \le H < 240°$, $$r_{11} = 0, r_{21} = \frac{H - 180°}{60°}, r_{31} = 1 - \frac{H - 180°}{60°},$$

when $240° \le H < 300°$, $$r_{11} = 0, r_{21} = 1 - \frac{H - 240°}{60°}, r_{31} = \frac{H - 240°}{60°},$$

when $300° \le H < 0°$, $$r_{11} = 0, r_{21} = \frac{H - 300°}{60°}, r_{31} = 1 - \frac{H - 300°}{60°},$$

when $0° \le H < 600°$, $$r_{11} = \frac{H}{60°}, r_{21} = 1 - \frac{H}{60°}, r_{31} = 0;$$

wherein, the second ratio $r_{12}$ corresponding to yellow, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to yellow, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, a hue of the color with the hue is 120°, wherein the first ratio $r_{11}$ corresponding to green, the first ratio $r_{21}$ corresponding to white, and the first ratio $r_{31}$ corresponding to black are expressed by the following formula:

when $120° \le H < 180°$, $$r_{11} = 1 - \frac{H - 120°}{60°}, r_{21} = \frac{H - 120°}{60°}, r_{31} = 0,$$

when $180° \le H < 240°$, $$r_{11} = 0, r_{21} = 1 - \frac{H - 180°}{60°}, r_{31} = \frac{H - 180°}{60°},$$

when $240° \le H < 300°$, $$r_{11} = 0, r_{21} = \frac{H - 240°}{60°}, r_{31} = 1 - \frac{H - 240°}{60°},$$

when $300° \le H < 0°$, $$r_{11} = 0, r_{21} = 1 - \frac{H - 300°}{60°}, r_{31} = \frac{H - 300°}{60°},$$

when $0° \le H < 60°$, $$r_{11} = 0, r_{21} = \frac{H}{60°}, r_{31} = 1 - \frac{H}{60°},$$

when $60° \le H < 120°$, $$r_{11} = \frac{H - 60°}{60°}, r_{21} = 1 - \frac{H - 60°}{60°}, r_{31} = 0;$$

wherein, the second ratio $r_{12}$ corresponding to green, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to green, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, a hue of the color with the hue is 180°, wherein the first ratio $r_{11}$ corresponding to cyan, the first ratio $r_{21}$ corresponding to white, and the first ratio $r_{31}$ corresponding to black are expressed by the following equations:

when $180° \le H < 240°$ $$r_{11} = 1 - \frac{H - 180°}{60°}, r_{21} = \frac{H - 180°}{60°}, r_{31} = 0,$$

when $240° \le H < 300°$ $$r_{11} = 0, r_{21} = 1 - \frac{H - 240°}{60°}, r_{31} = \frac{H - 240°}{60°},$$

when $300° \leq H < 0°$, $$r_{11} = 0, r_{21} = \frac{H - 300°}{60°}, r_{31} = 1 - \frac{H - 300°}{60°},$$

when $0° \leq H < 60°$, $$r_{11} = 0, r_{21} = 1 - \frac{H}{60°}, r_{31} = \frac{H}{60°},$$

when $60° \leq H < 120°$, $$r_{11} = 0, r_{21} = \frac{H - 60°}{60°}, r_{31} = 1 - \frac{H - 60°}{60°},$$

when $120° \leq H < 180°$, $$r_{11} = \frac{H - 120°}{60°}, r_{21} = 1 - \frac{H - 120°}{60°}, r_{31} = 0;$$

wherein, the second ratio $r_{12}$ corresponding to cyan, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to cyan, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times + \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, a hue of the color with the hue is 240°, wherein the first ratio $r_{11}$ corresponding to blue, the first ratio $r_{21}$ corresponding to white, and the first ratio $r_{31}$ corresponding to black are expressed by the following formula:

when $240° \leq H < 300°$, $$r_{11} = 1 - \frac{H - 240°}{60°}, r_{21} = \frac{H - 240°}{60°}, r_{31} = 0,$$

when $300° \leq H < 0°$, $$r_{11} = 0, r_{21} = 1 - \frac{H - 300°}{60°}, r_{31} = \frac{H - 300°}{60°},$$

when $0° \leq H < 60°$, $$r_{11} = 0, r_{21} = \frac{H}{60°}, r_{31} = 1 - \frac{H}{60°},$$

when $60° \leq H < 120°$, $$r_{11} = 0, r_{21} = 1 - \frac{H - 60°}{60°}, r_{31} = \frac{H - 60°}{60°},$$

when $120° \leq H < 180°$, $$r_{11} = 0, r_{21} = \frac{H - 120°}{60°}, r_{31} = 1 - \frac{H - 120°}{60°},$$

when $180° \leq H < 240°$, $$r_{11} = \frac{H - 180°}{60°}, r_{21} = 1 - \frac{H - 180°}{60°}, r_{31} = 0;$$

wherein, the second ratio $r_{12}$ corresponding to blue, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to blue, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times + \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, a hue of the color with the hue is 300°, wherein the first ratio $r_{11}$ corresponding to magenta, the first ratio $r_{21}$ corresponding to white, and the first ratio $r_{31}$ corresponding to black are expressed by the following formula:

when $300° \leq H < 0°$, $$r_{11} = 1 - \frac{H - 300°}{60°}, r_{21} = \frac{H - 300°}{60°}, r_{31} = 0,$$

when $0° \leq H < 60°$, $$r_{11} = 0, r_{21} = 1 - \frac{H}{60°}, r_{31} = \frac{H}{60°},$$

when $60° \leq H < 120°$, $$r_{11} = 0, r_{21} = \frac{H - 60°}{60°}, r_{31} = 1 - \frac{H - 60°}{60°},$$

when $120° \leq H < 180°$, $$r_{11} = 0, r_{21} = 1 - \frac{H - 120°}{60°}, r_{31} = \frac{H - 120°}{60°},$$

when $180° \leq H < 240°$, $$r_{11} = 0, r_{21} = \frac{H - 180°}{60°}, r_{31} = 1 - \frac{H - 180°}{60°},$$

when $240° \leq H < 300°$, $$r_{11} = \frac{H - 240°}{60°}, r_{21} = 1 - \frac{H - 240°}{60°}, r_{31} = 0;$$

wherein, the second ratio $r_{12}$ corresponding to magenta, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to magenta, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

In an embodiment of the present disclosure, the method further comprises: after determining the target color of the pixel, performing error diffusion on the pixel.

In an embodiment of the present disclosure, the error diffusion is performed based on a Floyd-Steinberg filter.

In a second aspect of the present disclosure, a storage medium is provided. The storage medium has computer instructions stored thereon, wherein the computer instructions are executed by a processor to perform the method described in the first aspect of the present disclosure.

In a third aspect of the present disclosure, an apparatus is provided. The apparatus comprises one or more processors, the processors are configured to execute computer instructions to perform the method described in the first aspect of the present disclosure.

Further adaptive aspects and scope will become apparent from the description provided herein. It should be understood that various aspects of the present application may be implemented alone or in combination with one or more other aspects. It should also be understood that the description and specific embodiments herein are intended to be illustrative and not limiting the scope of this application.

BRIEF DESCRIPTION OF THE DRAWINGS

The drawings described herein are only for the purpose of illustrations of the selected embodiments rather than any possible implementation, and they are not intended to limit the scope of this application, in which.

DETAILED DESCRIPTION

In order to make the objectives, technical solutions, and advantages of the embodiments of the present disclosure clearer, the technical solutions of the embodiments of the present disclosure will be described clearly and completely in conjunction with the accompanying drawings of the embodiments of the present disclosure. Obviously, the described embodiments are only a part of the embodiments of the present disclosure, rather than all the embodiments. Based on the described embodiments of the present disclosure, all other embodiments obtained by those of ordinary skill in the art without creative labor are within the protection scope of the present disclosure. Hereinafter, the embodiments of the present disclosure will be described in detail with reference to the drawings and in conjunction with the embodiments. It should be noted that, in the case of no conflict, the features in the embodiments of the present disclosure can be combined with each other.

Usually, ink screens can only display a few colors. In order to enable a color image to be displayed on the ink screen, it is necessary to convert the color image into a target image comprising the colors supported by the ink screen.

Figure 1:
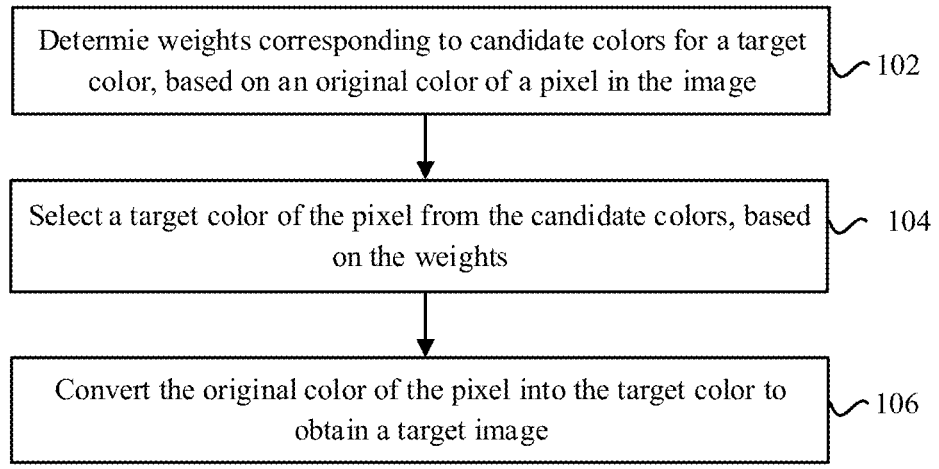
FIG. 1 is a schematic flowchart of a method for processing an image according to an embodiment of the present disclosure.

FIG. 1 is a schematic flowchart of a method for processing an image according to an embodiment of the present disclosure. As shown in FIG. 1, first, in step 102, weights corresponding to candidate colors for a target color are determined based on an original color of a pixel in the image. Then, in step 104, the target color of the pixel is selected from the candidate colors based on the weights of the candidate colors. Finally, in step 106, the original color of the pixel is converted into the target color to obtain the target image.

It can be seen from the above description that with the method according to the embodiment of the present disclosure, by determining the weight of each candidate color, the image can be converted into the target image that only comprises the candidate colors. Thereby the target image can be represented by a limited number of candidate colors.

In step 104, the process of selecting the target color of the pixel comprises the following two steps. First, a weight with a maximum value among the weights of the candidate colors is determined. Then, the candidate color corresponding to the weight with the maximum value is selected as the target color of the pixel. By selecting the weight with the maximum value, the target color of the pixel can be closer to its original color.

In the embodiment of the present disclosure, the original color of the pixel may be represented by components in a color space. For example, the original color of the pixel can be represented by three components of R, G, and B in the RGB color space. Alternatively, the original color of the pixel can also be represented by three components of H, S, and V in the HSV color space.

It can be understood that those skilled in the art can convert the original color of the pixel from the R, G, and B components in the RGB color space to the H, S, and V components in the HSV color space.

In step 102, the process of determining the weights corresponding to the candidate colors comprises the following two steps. First, based on the candidate colors, a color conversion space is established in the HSV color space. Then, in the color conversion space, the weights corresponding to the candidate colors are determined.

In the embodiment of the present disclosure, the candidate colors may comprise a color with a hue, white, and black. In this embodiment, the weights corresponding to the candidate colors comprise a first weight corresponding to the color with the hue, a second weight corresponding to white, and a third weight corresponding to black. In the following embodiment, the number of candidate colors being three is taken as an example for description.

It can be understood that the number of candidate colors may not be limited to three, for example, it may be four (two colors with different hues, white and black). In addition, the color with the hue may be any color on the H component in the HSV color space, for example, it may be red, yellow, green, cyan, blue, or magenta.

Figure 2:
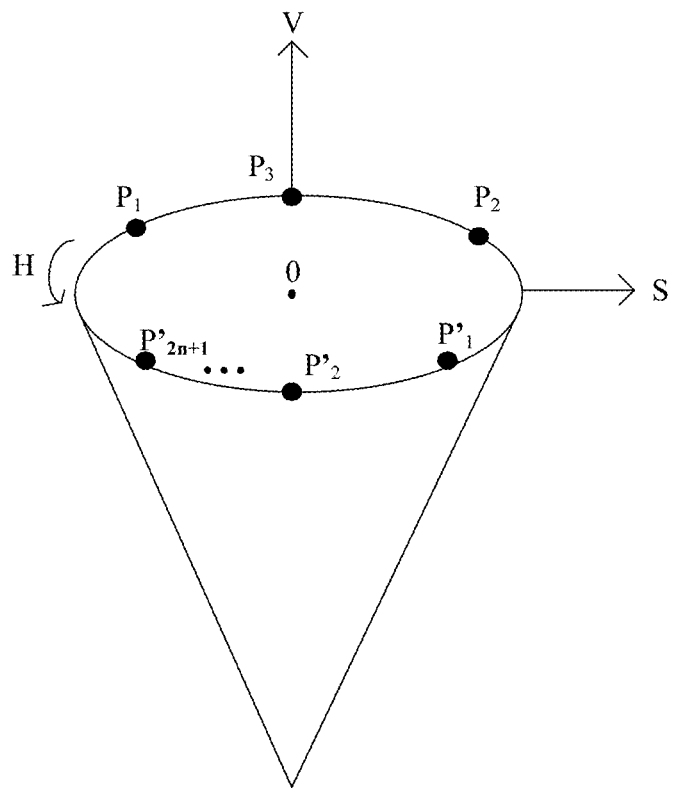
FIG. 2 is a schematic diagram of a color conversion space according to an embodiment of the present disclosure.

The process of establishing the color conversion space will be described in detail below. FIG. 2 is a schematic diagram of a color conversion space according to an embodiment of the present disclosure. The establishment of the color conversion space comprises the following three steps. First, when the S component and the V component are at their maximum values (that is, on the circumference corresponding to the top surface of the cone shown in FIG. 2), the H component has a plurality endpoints. The plurality of endpoints comprises a first endpoint P1 and a second endpoint P2 both representing white, a third endpoint P3 representing the color with a hue, and an odd number of additional endpoints P'1, P'2 . . . P'2n+1 representing black or white (n is an integer greater than or equal to zero). As shown in FIG. 2, the first endpoint P1 and the second endpoint P2 divide the H component as a whole into a first interval and a second interval continuous with each other. The third endpoint P3 is located in the first interval, and the additional endpoints P'1, P'2 . . . P'2n+1 are located in the second interval. When the number of additional endpoints is 1 (i.e., when n is equal to zero), the additional endpoint represents black. When the number of additional endpoints is greater than 1 (i.e., when n is an integer greater than zero), one of two closest additional endpoints represents white and the other of the two closest additional endpoints represents black, and two additional endpoints respectively closest to the first endpoint P1 and the second endpoint P2 represent black. As shown in FIG. 2, the additional endpoint P'2n+1 closest to the first endpoint P1 represents black, and the additional endpoint P'1 closest to the second endpoint P2 represents black. After defining the colors represented by the aforementioned endpoints, the color between any two closest endpoints is a transition of colors of the two endpoints. Specifically, the color between the first endpoint P1 and the third endpoint P3 can be a transition from white to a color with a hue, and the color between the third endpoint P3 and the second endpoint P2 can be a transition from a color with a hue to white, the color between the second endpoint P2 and the additional endpoint P'1 can be a transition from white to black, and the color between the additional endpoint P'1 and the additional endpoint P'2 can be a transition from black to white, and so on, the color between the additional endpoint P'2n and the additional endpoint P'2n+1 can be a transition from white to black, and the color between the additional endpoint P'2n+1 and the first endpoint P1 can be a transition from black to white. So far, the first step in establishing a color conversion space has been described.

Then, as the S component gradually decreases (that is, in an opposite direction of the arrow of the S component shown in FIG. 2), the color in the color conversion space is gradually converted to white. This is because, in the HSV color space, the S component indicates how close the color is to the spectral color, where the larger the S component, the closer the color is to the spectral color (that is, the smaller the white light component), and the smaller the S component, the closer the color is to white (that is, the larger the white light component).

Finally, as the V component gradually decreases (that is, along the opposite direction of the arrow of the V component shown in FIG. 2), the color in the color conversion space gradually changes to black. This is because, in the HSV color space, the V component represents the brightness of the color, where the smaller the V component, the closer the color is to black, and the larger the V component, the closer the color is to white.

So far, the establishment process from HSV color space to color conversion space has been described.

Next, in the established color conversion space, how to determine the weights corresponding to the candidate colors will be discussed. First, when the S component and the V component are at the maximum values, the first ratios of the candidate colors are determined based on the H component, where the sum of the first ratios of the candidate colors is 1, for example, the sum of the first ratio of the color with the hue, the first ratio of white and the first ratio of black is 1. Then, based on the determined first ratios and the S component, second ratios of the candidate colors are determined, wherein the sum of the second ratios of the candidate colors is 1, for example, the sum of the second ratio of the color with the hue, the second ratio of white and the second ratio of black is 1. Finally, based on the determined second ratios and the V component, the weights corresponding to the candidate colors are determined, where the sum of the weights of the candidate colors is 1, for example, the sum of the first weight corresponding to the color with the hue, the second weight corresponding to white and the third weight corresponding to black is 1.

In the embodiment of the present disclosure, the hue of a color with a hue in the HSV space can be expressed by the following formula:

$$H = N \times 60°,$$

where, N is an integer and $0 \leq N \leq 5$. Specifically, when H of 0° (that is, N=0) represents red, when H of 60° (that is, N=1) represents yellow, when H of 120° (that is, N=2) represents green, and H of 180° (that is, N=3) represents cyan, H of 240° (that is, N=4) represents blue, and H of 300° represents magenta.

In the embodiment of the present disclosure, the endpoints may comprise six endpoints (for example, $P_1$, $P_2$, $P_3$, $P'_1$, $P'_2$, $P'_3$), and the H coordinates of the six endpoints may be 0°, 60°, 120°, 180°, 240°, 300°. The following takes the endpoints comprising six endpoints as an example for detailed description.

Figures 3, 4:
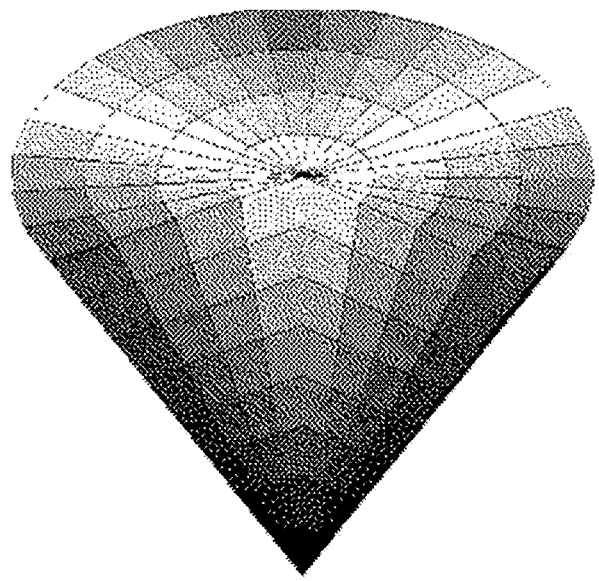
FIG. 3 is a schematic diagram of a color conversion space according to another embodiment of the present disclosure.
FIG. 4 is a schematic diagram of error diffusion from one pixel to surrounding pixels according to an embodiment of the present disclosure.

In an embodiment of the present disclosure, the hue of the color with the hue is 0°, that is, the color with the hue is red. In this embodiment, the color conversion space as shown in FIG. 3 can be established. Specifically, when the S component and the V component are at the maximum values, the H coordinates of the first endpoint P1 and the second endpoint P2 both representing white are 300° and 60°, respectively, and the H coordinate of the third endpoint P3 representing red is 0°, the H coordinate of the additional endpoint P'1 representing black is 120°, the H coordinate of the additional endpoint P'2 representing white is 180°, the H coordinate of the additional endpoint P'3 representing black is 240°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to red, the first ratio r21 corresponding to white, and the first ratio r31 corresponding to black are expressed by the following formula:

when $0° \leq H < 60°$, $$r_{11} = 1 - \frac{H}{60°}, r_{21} = \frac{H}{60°}, r_{31} = 0,$$

when $60° \leq H < 120°$,

-continued $$r_{11} = 0, r_{21} = 1 - \frac{H - 60°}{60°}, r_{31} = \frac{H - 60°}{60°},$$

when $120° \leq H < 180°$, $$r_{11} = 0, r_{21} = \frac{H - 120°}{60°}, r_{31} = 1 - \frac{H - 120°}{60°},$$

when $180° \leq H < 240°$, $$r_{11} = 0, r_{21} = 1 - \frac{H - 180°}{60°}, r_{31} = \frac{H - 180°}{60°},$$

when $240° \leq H < 300°$, $$r_{11} = 0, r_{21} = \frac{H - 240°}{60°}, r_{31} = 1 - \frac{H - 240°}{60°},$$

when $300° \leq H < 360°$, $$r_{11} = \frac{H - 300°}{60°}, r_{21} = 1 - \frac{H - 300°}{60°}, r_{31} = 0;$$

wherein, the second ratio $r_{12}$ corresponding to red, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to red, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times + \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are red, white, and black.

In yet another embodiment of the present disclosure, the hue of the color with the hue is 60°, that is, the color with the hue is yellow. In this embodiment, the color conversion space can be established as the following. When the S component and the V component are at the maximum values, the H coordinates of the first endpoint P1 and the second endpoint P2 both representing white are 0° and 120°, respectively, and the H coordinate of the third endpoint P3 representing yellow is 60°, the H coordinate of the additional endpoint P'1 representing black is 180°, the H coordinate of the additional endpoint P'2 representing white is 240°, and the H coordinate of the additional endpoint P'3 representing black is 300°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to yellow, the first ratio r21 corresponding to white, and the first ratio r31 corresponding to black are expressed by the following formula:

when $60° \leq H < 120°$, $$r_{11} = 1 - \frac{H - 60°}{60°}, r_{21} = \frac{H - 60°}{60°}, r_{31} = 0,$$

when $120° \leq H < 180°$, $$r_{11} = 0, r_{21} = 1 - \frac{H - 120°}{60°}, r_{31} = \frac{H - 120°}{60°},$$

when $180° \leq H < 240°$, $$r_{11} = 0, r_{21} = 1 - \frac{H - 180°}{60°}, r_{31} = \frac{H - 180°}{60°},$$

when $240° \leq H < 300°$, $$r_{11} = 0, r_{21} = 1 - \frac{H - 240°}{60°}, r_{31} = \frac{H - 240°}{60°},$$

when $300° \leq H < 0°$, $$r_{11} = 0, r_{21} = \frac{H - 300°}{60°}, r_{31} = 1 - \frac{H - 300°}{60°},$$

when $0° \leq H < 600°$, $$r_{11} = \frac{H}{60°}, r_{21} = 1 - \frac{H}{60°}, r_{31} = 0;$$

wherein, the second ratio $r_{12}$ corresponding to yellow, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to yellow, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times + \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are yellow, white, and black.

In another embodiment of the present disclosure, the hue of color with the hue is 120°, that is, the color with the hue is green. In this embodiment, the color conversion space can be established as the following. When the S component and the V component are at the maximum values, the H coordinates of the first endpoint P1 and the second endpoint P2 both representing white are 60° and 180°, respectively, and the H coordinate of the third endpoint P3 representing green is 120°, the H coordinate of the additional endpoint P'1 representing black is 240°, the H coordinate of the additional endpoint P'2 representing white is 300°, and the H coordinate of the additional endpoint P'3 representing black is 0°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to green, the first ratio r21 corresponding to white, and the first ratio r31 corresponding to black are expressed by the following formula:

when $120° \leq H < 180°$,
$$r_{11} = 1 - \frac{H - 120°}{60°}, r_{21} = \frac{H - 120°}{60°}, r_{31} = 0,$$

when $180° \leq H < 240°$,
$$r_{11} = 0, r_{21} = 1 - \frac{H - 180°}{60°}, r_{31} = \frac{H - 180°}{60°},$$

when $240° \leq H < 300°$,
$$r_{11} = 0, r_{21} = \frac{H - 240°}{60°}, r_{31} = 1 - \frac{H - 240°}{60°},$$

when $300° \leq H < 0°$,
$$r_{11} = 0, r_{21} = 1 - \frac{H - 300°}{60°}, r_{31} = \frac{H - 300°}{60°},$$

when $0° \leq H < 60°$,
$$r_{11} = 0, r_{21} = \frac{H}{60°}, r_{31} = 1 - \frac{H}{60°},$$

when $60° \leq H < 120°$,
$$r_{11} = \frac{H - 60°}{60°}, r_{21} = 1 - \frac{H - 60°}{60°}, r_{31} = 0;$$

wherein, the second ratio $r_{12}$ corresponding to green, the second ratio $r_{22}$ corresponding to white, and the second ratio $r_{32}$ corresponding to black are expressed by the following formula:

$$r_{12} = r_{11} \times \frac{s}{s_{max}},$$
$$r_{22} = r_{21} \times \frac{s}{s_{max}} + \left(1 - \frac{s}{s_{max}}\right),$$
$$r_{32} = r_{31} \times \frac{s}{s_{max}},$$

wherein, the first weight $r_{13}$ corresponding to green, the second weight $r_{23}$ corresponding to white, and the third weight $r_{33}$ corresponding to black are represented by the following formula:

$$r_{13} = r_{12} \times \frac{v}{v_{max}},$$
$$r_{23} = r_{22} \times \frac{v}{v_{max}},$$
$$r_{33} = r_{32} \times \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are green, white, and black.

In still another embodiment of the present disclosure, the hue of the color with the hue is 180°, that is, the color with the hue is cyan. In this embodiment, the color conversion space can be established as the following. When the S component and the V component are at the maximum values, the H coordinates of the first endpoint P1 and the second endpoint P2 both representing white are 120° and 240°, respectively, and the H coordinate of the third endpoint P3 representing green is 180°, the H coordinate of the additional endpoint P'1 representing black is 300°, the H coordinate of the additional endpoint P'2 representing white is 0°, and the H coordinate of the additional endpoint P'3 representing black is 60°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to cyan, the first ratio r21 corresponding to white, and the first ratio r31 corresponding to black are expressed by the following equations:

when $180° \leq H < 240°$,
$$r_{11} = 1 - \frac{H - 180°}{60°}, r_{21} = \frac{H - 180°}{60°}, r_{31} = 0,$$

when $240° \leq H < 300°$,
$$r_{11} = 0, r_{21} = 1 - \frac{H - 240°}{60°}, r_{31} = \frac{H - 240°}{60°},$$

when $300° \leq H < 0°$,
$$r_{11} = 0, r_{21} = \frac{H - 300°}{60°}, r_{31} = 1 - \frac{H - 300°}{60°},$$

when $0° \leq H < 60°$,
$$r_{11} = 0, r_{21} = 1 - \frac{H}{60°}, r_{31} = \frac{H}{60°},$$

when $60° \leq H < 120°$,
$$r_{11} = 0, r_{21} = \frac{H - 60°}{60°}, r_{31} = 1 - \frac{H - 60°}{60°},$$

when $120° \leq H < 180°$,
$$r_{11} = \frac{H - 120°}{60°}, r_{21} = 1 - \frac{H - 120°}{60°}, r_{31} = 0;$$

wherein, the second ratio $r_{12}$ corresponding to cyan, the second ratio $r_{22}$ corresponding to white, and the second ratio $r_{32}$ corresponding to black are expressed by the following formula:

$$r_{12} = r_{11} \times \frac{s}{s_{max}},$$
$$r_{22} = r_{21} \times \frac{s}{s_{max}} + \left(1 - \frac{s}{s_{max}}\right),$$
$$r_{32} = r_{31} \times \frac{s}{s_{max}},$$

wherein, the first weight $r_{13}$ corresponding to cyan, the second weight $r_{23}$ corresponding to white, and the third weight $r_{33}$ corresponding to black are represented by the following formula:

$$r_{13} = r_{12} \times \frac{v}{v_{max}},$$
$$r_{23} = r_{22} \times \frac{v}{v_{max}},$$

-continued $$r_{33} = r_{32} \times \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are cyan, white, and black.

In still another embodiment of the present disclosure, the hue of the color with the hue is 240°, that is, the color with the hue is blue. In this embodiment, the color conversion space can be established as the following. When the S component and the V component are at maximum values, the H coordinates of the first endpoint P1 and the second endpoint P2 both representing white are 180° and 300°, respectively, and the H coordinate of the third endpoint P3 representing blue is 240°, the H coordinate of the additional endpoint P'1 representing black is 0°, the H coordinate of the additional endpoint P'2 representing white is 60°, the H coordinate of the additional endpoint P'3 representing black is 120°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to blue, the first ratio r21 corresponding to white, and the first ratio r31 corresponding to black are expressed by the following formula:

when $240° \leq H < 300°$, $$r_{11} = 1 - \frac{H - 240°}{60°}, r_{21} = \frac{H - 240°}{60°}, r_{31} = 0,$$

when $300° \leq H < 0°$, $$r_{11} = 0, r_{21} = 1 - \frac{H - 300°}{60°}, r_{31} = \frac{H - 300°}{60°},$$

when $0° \leq H < 60°$, $$r_{11} = 0, r_{21} = \frac{H}{60°}, r_{31} = 1 - \frac{H}{60°},$$

when $60° \leq H < 120°$, $$r_{11} = 0, r_{21} = 1 - \frac{H - 60°}{60°}, r_{31} = \frac{H - 60°}{60°},$$

when $120° \leq H < 180°$, $$r_{11} = 0, r_{21} = \frac{H - 120°}{60°}, r_{31} = 1 - \frac{H - 120°}{60°},$$

when $180° \leq H < 240°$, $$r_{11} = \frac{H - 180°}{60°}, r_{21} = 1 - \frac{H - 180°}{60°}, r_{31} = 0;$$

wherein, the second ratio $r_{12}$ corresponding to blue, the second ratio $r_{22}$ corresponding to white, and the second ratio $r_{32}$ corresponding to black are expressed by the following formula:

$$r_{12} = r_{11} \times \frac{s}{s_{max}},$$

$$r_{22} = r_{21} \times \frac{s}{s_{max}} + \left(1 - \frac{s}{s_{max}}\right),$$

$$r_{32} = r_{31} \times \frac{s}{s_{max}},$$

wherein, the first weight $r_{13}$ corresponding to blue, the second weight $r_{23}$ corresponding to white, and the third weight $r_{33}$ corresponding to black are represented by the following formula:

$$r_{13} = r_{12} \times \frac{v}{v_{max}},$$

$$r_{23} = r_{22} \times \frac{v}{v_{max}},$$

$$r_{33} = r_{32} \times \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are blue, white, and black.

In still another embodiment of the present disclosure, the hue of the color with the hue is 300°, that is, the color with the hue is magenta. In this embodiment, the color conversion space can be established as the following. When the S component and the V component are at maximum values, the H coordinates of the first endpoint P1 and the second endpoint P2 both representing white are 0° and 240°, respectively, and the H coordinate of the third endpoint P3 representing magenta is 300°, the H coordinate of the additional endpoint P'1 representing black is 60°, the H coordinate of the additional endpoint P'2 representing white is 120°, the H coordinate of the additional endpoint P'3 representing black is 180°, and the color between the any two closest endpoints can be a transition of the colors of the two endpoints. As the S component gradually decreases, the color in the color conversion space gradually changes to white. As the V component gradually decreases, the color in the color conversion space gradually changes to black.

In this embodiment, the first ratio r11 corresponding to magenta, the first ratio r21 corresponding to white, and the first ratio r31 corresponding to black are expressed by the following formula:

when $300° \leq H < 0°$, $$r_{11} = 1 - \frac{H - 300°}{60°}, r_{21} = \frac{H - 300°}{60°}, r_{31} = 0,$$

when $0° \leq H < 60°$, $$r_{11} = 0, r_{21} = 1 - \frac{H}{60°}, r_{31} = \frac{H}{60°},$$

when $60° \leq H < 120°$, $$r_{11} = 0, r_{21} = \frac{H - 60°}{60°}, r_{31} = 1 - \frac{H - 60°}{60°},$$

when $120° \leq H < 180°$, $$r_{11} = 0, r_{21} = 1 - \frac{H - 120°}{60°}, r_{31} = \frac{H - 120°}{60°},$$

when $180° \leq H < 240°$,

-continued $$r_{11} = 0, r_{21} = \frac{H - 180°}{60°}, r_{31} = 1 - \frac{H - 180°}{60°},$$

when $240° \leq H < 300°$, $$r_{11} = \frac{H - 240°}{60°}, r_{21} = 1 - \frac{H - 240°}{60°}, r_{31} = 0;$$

wherein, the second ratio $r_{12}$ corresponding to magenta, the second ratio $r_{22}$ corresponding to white, and the second ratio $r_{32}$ corresponding to black are expressed by the following formula:

$$r_{12} = r_{11} \times \frac{s}{s_{max}},$$

$$r_{22} = r_{21} \times \frac{s}{s_{max}} + \left(1 - \frac{s}{s_{max}}\right),$$

$$r_{32} = r_{31} \times \frac{s}{s_{max}},$$

wherein, the first weight $r_{13}$ corresponding to magenta, the second weight $r_{23}$ corresponding to white, and the third weight $r_{33}$ corresponding to black are represented by the following formula:

$$r_{13} = r_{12} \times \frac{v}{v_{max}},$$

$$r_{23} = r_{22} \times \frac{v}{v_{max}},$$

$$r_{33} = r_{32} \times \frac{v}{v_{max}} + \left(1 - \frac{v}{v_{max}}\right),$$

wherein, $S_{max}$ represents the maximum value in the S component, and $V_{max}$ represents the maximum value in the V component.

So far, the first weight, the second weight, and the third weight can be obtained through this embodiment, when the candidate colors are magenta, white, and black.

It should be understood that, for the HSV color space, the values of $S_{max}$ and $V_{max}$ in the above-mentioned embodiment may both be 1.

After the first weight, the second weight, and the third weight are obtained, the weight with the maximum value is determined, and the candidate color corresponding to the weight with the maximum value is selected as the target color. It can be understood that after the target color of the pixel is determined, the value of the RGB component of the pixel may be set to the value of the RGB component corresponding to the target color. For example, in an embodiment where the candidate colors are red, white, and black, if the value of the first weight corresponding to red is the maximum value, then red is selected as the target color of the pixel, and the value of the RGB component of the pixel is set to (255, 0, 0).

In the embodiment of the present disclosure, after the target color of the pixel is determined, error diffusion is performed on the pixel. FIG. 4 is a schematic diagram of error diffusion from one pixel to surrounding pixels according to an embodiment of the present disclosure, which is based on a Floyd-Steinberg filter. As shown in FIG. 4, the error value between the original color and the target color of the pixel 110 is diffused to surrounding pixels 112, 114, 116, 118, 120, 122, 124, 126, 128, 130, 132, and 134. As shown in FIG. 4, pixel 112 receives 7/48 of the error value from pixel 110, pixel 114 receives 5/48 of the error value from pixel 110, pixel 116 receives 3/48 of the error value from pixel 110, and pixel 118 receives 5/48 of the error value from pixel 110, pixel 120 receives 7/48 of the error value from pixel 110, pixel 122 receives 5/48 of the error value from pixel 110, pixel 124 receives 3/48 of the error value from pixel 110, and pixel 126 receives 1/48 of the error value from pixel 110, pixel 128 receives 3/48 of the error value from pixel 110, pixel 130 receives 5/48 of the error value from pixel 110, pixel 132 receives 3/48 of the error value from pixel 110, and pixel 134 receives 1/48 of the error value from pixel 110. By performing error diffusion on pixels, the target image has a better visual effect. It should be noted that, in the case of error diffusion, the original color of each pixel described above in the present disclosure is the original color after diffusing errors from surrounding pixels, for example, before determining the target color of the pixel to be processed, error diffusion is used to correct the original color of the pixel to be processed.

In addition, it can be understood that those skilled in the art can also perform error diffusion on pixels based on the JF Jarvis filter, the Burkes filter, or the Stucki filter.

Figure 5A:
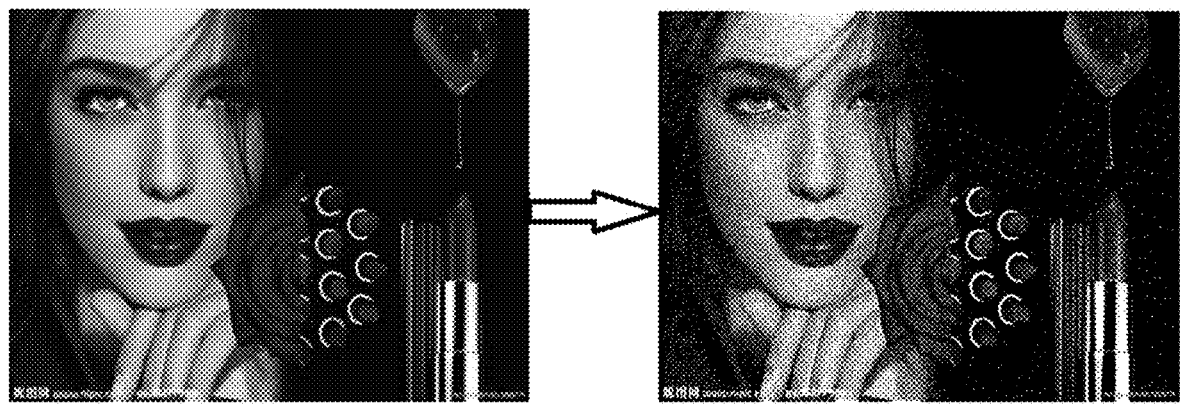
FIGS. 5A-5C illustrate a process of converting an image into a target image according to a method of an embodiment of the present disclosure.
Figure 5B:
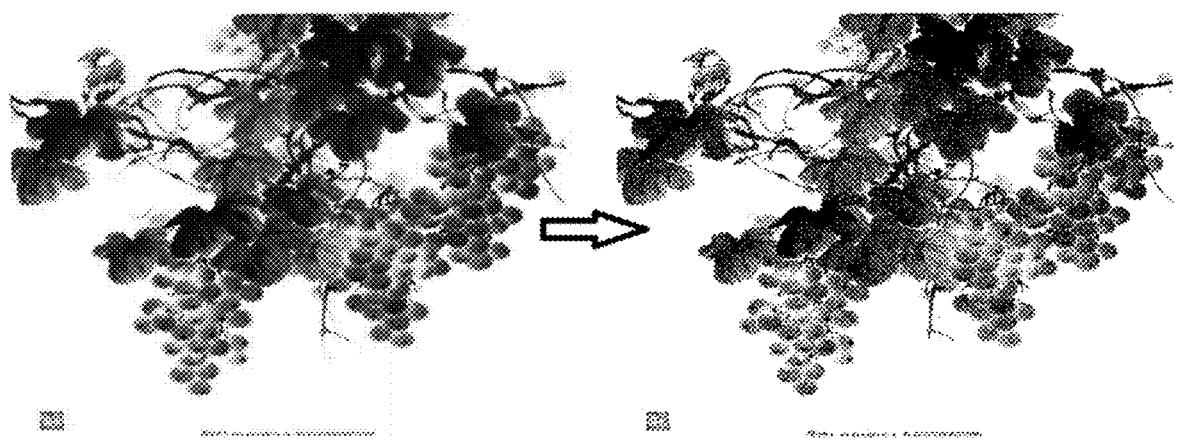
Figure 5C:
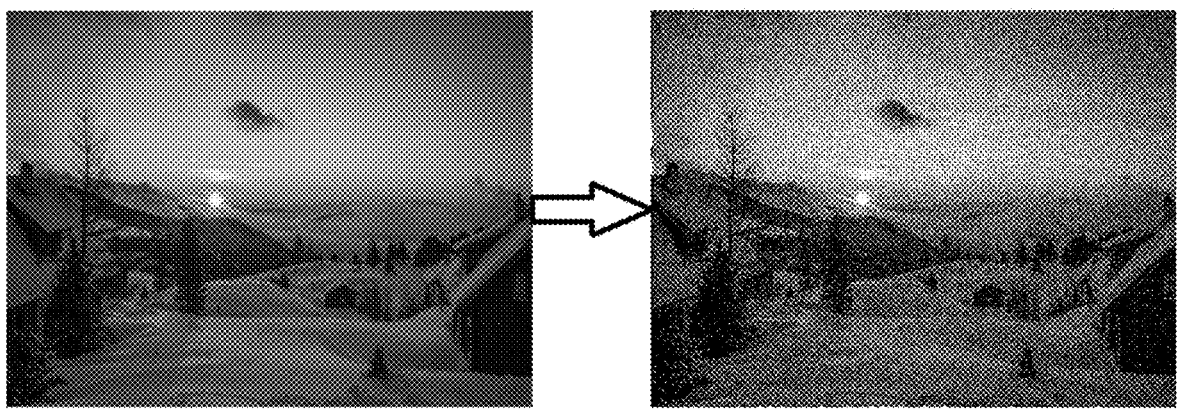

FIGS. 5A-5C illustrate a process of converting an image into a target image according to a method of an embodiment of the present disclosure. The left of FIGS. 5A-5C is the image before processing, and the right of FIGS. 5A-5C is the target image after processing. The colors of the target image comprise red, black, and white, and the pixels in the target image are performed error diffusion based on the Floyd-Steinberg filter. As shown in FIGS. 5A-5C, by using a limited number of candidate colors to represent the target image, the target image visually forms a continuous hue effect, thereby having a better visual effect.

In other embodiments of the present disclosure, a storage medium is also provided. The storage medium stores computer instructions, where the computer instructions execute the method for processing an image of the present disclosure when executed by a processor.

In other embodiments of the present disclosure, an apparatus is also provided. The apparatus may comprise one or more processors, wherein the processor is configured to execute computer instructions to perform the method for processing images of the present disclosure.

The specific embodiments of the present disclosure have been described above, but the scope of the present disclosure is not limited thereto. For those skilled in the art, the present disclosure can have various modifications and changes. Any modification, equivalent replacement, improvement, etc., made within the spirit and principle of the present disclosure shall be comprised in the protection scope of the present disclosure.

What is claimed is:

1. A method for processing an image, comprising:
   determining weights corresponding to candidate colors for a target color based on an original color of a pixel in the image;
   selecting a target color of the pixel from the candidate colors based on the weights; and
   converting the original color of the pixel into the target color to obtain a target image,
   wherein selecting the target color of the pixel comprises:
   determining a weight with a maximum value among the weights; and
   selecting the candidate color corresponding to the weight with the maximum value as the target color, wherein determining the weights comprises:
establishing a color conversion space in a HSV color space based on the candidate colors;
in the color conversion space, determining the weights corresponding to the candidate colors,
wherein the candidate colors comprise a color with a hue, white or black, and the weights comprise a first weight corresponding to the color with the hue, a second weight corresponding to white, and a third weight corresponding to black,
wherein the color conversion space is established such that:
when a S component and a V component are at maximum values, a H component has a plurality endpoints, the endpoints comprise a first endpoint and a second endpoint both representing white, a third endpoint representing the color with the hue, and an odd number of additional endpoints representing black or white, wherein the first endpoint and the second endpoint divide the H component as a whole into a first interval and a second interval continuous with each other, and the third endpoint is located in the first interval, the additional endpoints are located in the second interval, and when a number of the additional endpoint is 1, the additional endpoint represents black, and when a number of the additional endpoints is greater than 1, one of two closest additional endpoints represents white and the other of the two closest additional endpoints represents black, and two additional endpoints respectively closest to the first endpoint and the second endpoint represent black, wherein, a color between any two closest endpoints is a transition of colors of the two endpoints;
as the S component gradually decreases, a color in the color conversion space gradually changes to white; and
as the V component gradually decreases, the color in the color conversion space gradually changes to black.

2. The method according to claim 1, wherein determining the weights comprises:
when the S component and the V component are at maximum values, determining first ratios of the candidate colors based on the H component, wherein a sum of the first ratios of the candidate colors is 1;
determining second ratios of the candidate colors based on the first ratios and the S component, wherein a sum of the second ratios of the candidate colors is 1; and
determining the weights of the candidate colors based on the second ratios and the V component, wherein a sum of the weights of the candidate color is 1.

3. The method according to claim 2, wherein the hue of the color with the hue in the HSV space is represented by the following formula:

$$H = N \times 60°,$$

wherein, N is an integer and $0 \leq N \leq 5$.

4. The method according to claim 3, wherein the endpoints comprise six endpoints, and H coordinates of the endpoints are 0°, 60°, 120°, 180°, 240°, and 300°, respectively.

5. The method according to claim 4, wherein the hue of the color with the hue is 0°, wherein the first ratio $r_{11}$ corresponding to red, the first ratio $r_{21}$ corresponding to white, and the first ratio $r_{31}$ corresponding to black are expressed by the following formula:

when $0° \leq H < 60°$,
$$r_{11} = 1 - \frac{H}{60°}, r_{21} = \frac{H}{60°}, r_{31} = 0,$$

when $60° \leq H < 120°$,
$$r_{11} = 0, r_{21} = 1 - \frac{H - 60°}{60°}, r_{31} = \frac{H - 60°}{60°},$$

when $120° \leq H < 180°$,
$$r_{11} = 0, r_{21} = \frac{H - 120°}{60°}, r_{31} = 1 - \frac{H - 120°}{60°},$$

when $180° \leq H < 240°$,
$$r_{11} = 0, r_{21} = 1 - \frac{H - 180°}{60°}, r_{31} = \frac{H - 180°}{60°},$$

when $240° \leq H < 300°$,
$$r_{11} = 0, r_{21} = \frac{H - 240°}{60°}, r_{31} = 1 - \frac{H - 240°}{60°},$$

when $300° \leq H < 360°$,
$$r_{11} = \frac{H - 300°}{60°}, r_{21} = 1 - \frac{H - 300°}{60°}, r_{31} = 0;$$

wherein, the second ratio $r_{12}$ corresponding to red, the second ratio $r_{22}$ corresponding to white, and the second ratio $r_{32}$ corresponding to black are expressed by the following formula:

$$r_{12} = r_{11} \times \frac{s}{s_{max}},$$
$$r_{22} = r_{21} \times \frac{s}{s_{max}} + \left(1 - \frac{s}{s_{max}}\right),$$
$$r_{32} = r_{31} \times \frac{s}{s_{max}},$$

wherein, the first weight $r_{13}$ corresponding to red, the second weight $r_{23}$ corresponding to white, and the third weight $r_{33}$ corresponding to black are represented by the following formula:

$$r_{13} = r_{12} \times \frac{v}{v_{max}},$$
$$r_{23} = r_{22} \times \frac{v}{v_{max}},$$
$$r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

6. The method according to claim 4, wherein the hue of the color with the hue is 60°, wherein the first ratio $r_{11}$ corresponding to yellow, the first ratio $r_{21}$ corresponding to white, and the first ratio $r_{31}$ corresponding to black are expressed by the following formula:

when $60° \leq H < 120°$,
$$r_{11} = 1 - \frac{H - 60°}{60°}, r_{21} = \frac{H - 60°}{60°}, r_{31} = 0,$$

when $120° \leq H < 180°$,

-continued $$r_{11} = 0, \; r_{21} = 1 - \frac{H - 120°}{60°}, \; r_{31} = \frac{H - 120°}{60°},$$

when $180° \leq H < 240°$, $$r_{11} = 0, \; r_{21} = 1 - \frac{H - 180°}{60°}, \; r_{31} = 1 - \frac{H - 180°}{60°},$$

when $240° \leq H < 300°$, $$r_{11} = 0, \; r_{21} = 1 - \frac{H - 240°}{60°}, \; r_{31} = \frac{H - 240°}{60°},$$

when $300° \leq H < 0°$, $$r_{11} = 0, \; r_{21} = \frac{H - 300°}{60°}, \; r_{31} = \frac{H - 300°}{60°},$$

when $0° \leq H < 600°$, $$r_{11} = \frac{H}{60°}, \; r_{21} = 1 - \frac{H}{60°}, \; r_{31} = 0;$$

wherein, the second ratio $r_{12}$ corresponding to yellow, the second ratio $r_{22}$ corresponding to white, and the second ratio $r_{32}$ corresponding to black are expressed by the following formula:

$$r_{12} = r_{11} \times \frac{s}{s_{max}}, \; r_{22} = r_{21} \times \frac{s}{s_{max}} + \left(1 - \frac{s}{s_{max}}\right), \; r_{32} = r_{31} \times \frac{s}{s_{max}},$$

wherein, the first weight $r_{13}$ corresponding to yellow, the second weight $r_{23}$ corresponding to white, and the third weight $r_{33}$ corresponding to black are represented by the following formula:

$$r_{13} = r_{12} \times \frac{v}{v_{max}}, \; r_{23} = r_{22} \times \frac{v}{v_{max}}, \; r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

7. The method according to claim 4, wherein the hue of the color with the hue is 120°, wherein the first ratio $r_{11}$ corresponding to green, the first ratio $r_{21}$ corresponding to white, and the first ratio $r_{31}$ corresponding to black are expressed by the following formula:

when $120° \leq H < 180°$, $$r_{11} = 1 - \frac{H - 120°}{60°}, \; r_{21} = \frac{H - 120°}{60°}, \; r_{31} = 0,$$

when $180° \leq H < 240°$, $$r_{11} = 0, \; r_{21} = 1 - \frac{H - 180°}{60°}, \; r_{31} = \frac{H - 180°}{60°},$$

when $240° \leq H < 300°$, $$r_{11} = 0, \; r_{21} = \frac{H - 240°}{60°}, \; r_{31} = 1 - \frac{H - 240°}{60°},$$

when $300° \leq H < 0°$, $$r_{11} = 0, \; r_{21} = 1 - \frac{H - 300°}{60°}, \; r_{31} = \frac{H - 300°}{60°},$$

when $0° \leq H < 60°$, $$r_{11} = 0, \; r_{21} = \frac{H}{60°}, \; r_{31} = 1 - \frac{H}{60°},$$

when $60° \leq H < 120°$, $$r_{11} = \frac{H - 60°}{60°}, \; r_{21} = 1 - \frac{H - 60°}{60°}, \; r_{31} = 0;$$

wherein, the second ratio $r_{12}$ corresponding to green, the second ratio $r_{22}$ corresponding to white, and the second ratio $r_{32}$ corresponding to black are expressed by the following formula:

$$r_{12} = r_{11} \times \frac{s}{s_{max}}, \; r_{22} = r_{21} \times \frac{s}{s_{max}} + \left(1 - \frac{s}{s_{max}}\right), \; r_{32} = r_{31} \times \frac{s}{s_{max}},$$

wherein, the first weight $r_{13}$ corresponding to green, the second weight $r_{23}$ corresponding to white, and the third weight $r_{33}$ corresponding to black are represented by the following formula:

$$r_{13} = r_{12} \times \frac{v}{v_{max}}, \; r_{23} = r_{22} \times \frac{v}{v_{max}}, \; r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

8. The method according to claim 4, wherein the hue of the color with the hue is 180°, wherein the first ratio $r_{11}$ corresponding to cyan, the first ratio $r_{21}$ corresponding to white, and the first ratio $r_{31}$ corresponding to black are expressed by the following equations:

when $180° \leq H < 240°$, $$r_{11} = 1 - \frac{H - 180°}{60°}, \; r_{21} = \frac{H - 180°}{60°}, \; r_{31} = 0,$$

when $240° \leq H < 300°$, $$r_{11} = 0, \; r_{21} = 1 - \frac{H - 240°}{60°}, \; r_{31} = \frac{H - 240°}{60°},$$

when $300° \leq H < 0°$, $$r_{11} = 0, \; r_{21} = \frac{H - 300°}{60°}, \; r_{31} = 1 - \frac{H - 300°}{60°},$$

when $0° \leq H < 60°$, $$r_{11} = 0, \; r_{21} = 1 - \frac{H}{60°}, \; r_{31} = \frac{H}{60°},$$

when $60° \leq H < 120°$, $$r_{11} = 0, \; r_{21} = \frac{H - 60°}{60°}, \; r_{31} = 1 - \frac{H - 60°}{60°},$$

when $120° \leq H < 180°$, $$r_{11} = \frac{H - 120°}{60°}, \; r_{21} = 1 - \frac{H - 120°}{60°}, \; r_{31} = 0;$$

wherein, the second ratio $r_{12}$ corresponding to cyan, the second ratio $r_{22}$ corresponding to white, and the second ratio $r_{32}$ corresponding to black are expressed by the following formula:

$$r_{12} = r_{11} \times \frac{s}{s_{max}}, \; r_{22} = r_{21} \times \frac{s}{s_{max}} + \left(1 - \frac{s}{s_{max}}\right), \; r_{32} = r_{31} \times \frac{s}{s_{max}},$$

wherein, the first weight $r_{13}$ corresponding to cyan, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

9. The method according to claim 4, wherein the hue of the color with the hue is 240°, wherein the first ratio $r_{11}$ corresponding to blue, the first ratio $r_{21}$ corresponding to white, and the first ratio $r_{31}$ corresponding to black are expressed by the following formula:

when $240° \leq H < 300°$,
$$r_{11} = 1 - \frac{H - 240°}{60°}, r_{21} = \frac{H - 240°}{60°}, r_{31} = 0,$$

when $300° \leq H < 0°$,
$$r_{11} = 0, r_{21} = 1 - \frac{H - 300°}{60°}, r_{31} = \frac{H - 300°}{60°},$$

when $0° \leq H < 60°$,
$$r_{11} = 0, r_{21} = \frac{H}{60°}, r_{31} = 1 - \frac{H}{60°},$$

when $60° \leq H < 120°$,
$$r_{11} = 0, r_{21} = 1 - \frac{H - 60°}{60°}, r_{31} = \frac{H - 60°}{60°},$$

when $120° \leq H < 180°$,
$$r_{11} = 0, r_{21} = \frac{H - 120°}{60°}, r_{31} = 1 - \frac{H - 120°}{60°},$$

when $180° \leq H < 240°$,
$$r_{11} = \frac{H - 180°}{60°}, r_{21} = 1 - \frac{H - 180°}{60°}, r_{31} = 0;$$

wherein, the second ratio $r_{12}$ corresponding to blue, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to blue, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

10. The method according to claim 4, wherein the hue of the color with the hue is 300°, wherein the first ratio $r_{11}$ corresponding to magenta, the first ratio $r_{21}$ corresponding to white, and the first ratio $r_{31}$ corresponding to black are expressed by the following formula:

when $300° \leq H < 0°$,
$$r_{11} = 1 - \frac{H - 300°}{60°}, r_{21} = \frac{H - 300°}{60°}, r_{31} = 0,$$

when $0° \leq H < 60°$,
$$r_{11} = 0, r_{21} = 1 - \frac{H}{60°}, r_{31} = \frac{H}{60°},$$

when $60° \leq H < 120°$,
$$r_{11} = 0, r_{21} = \frac{H - 60°}{60°}, r_{31} = 1 - \frac{H - 60°}{60°},$$

when $120° \leq H < 180°$,
$$r_{11} = 0, r_{21} = 1 - \frac{H - 120°}{60°}, r_{31} = \frac{H - 120°}{60°},$$

when $180° \leq H < 240°$,
$$r_{11} = 0, r_{21} = \frac{H - 180°}{60°}, r_{31} = 1 - \frac{H - 180°}{60°},$$

when $240° \leq H < 300°$,
$$r_{11} = \frac{H - 240°}{60°}, r_{21} = 1 - \frac{H - 240°}{60°}, r_{31} = 0;$$

wherein, the second ratio $r_{12}$ corresponding to magenta, the second ratio $r_{22}$ corresponding to white, and the second ratio $r_{32}$ corresponding to black are expressed by the following formula:

$$r_{12} = r_{11} \times \frac{s}{s_{max}}, r_{22} = r_{21} \times \frac{s}{s_{max}} + \left(1 - \frac{s}{s_{max}}\right), r_{32} = r_{31} \times \frac{s}{s_{max}},$$

wherein, the first weight $r_{13}$ corresponding to magenta, the second weight $r_{23}$ corresponding to white, and the third weight $r_{33}$ corresponding to black are represented by the following formula:

$$r_{13} = r_{12} \times \frac{v}{v_{max}}, r_{23} = r_{22} \times \frac{v}{v_{max}}, r_{33} = r_{32} \times \frac{v}{v_{max}} + \left(1 - \frac{v}{v_{max}}\right),$$

wherein, the $S_{max}$ represents a maximum value in the S component, and the $V_{max}$ represents a maximum value in the V component.

11. The method according to claim 5, further comprising: after determining the target color of the pixel, performing error diffusion on the pixel.

12. The method according to claim 11, wherein the error diffusion is performed based on a Floyd-Steinberg filter.

13. A storage medium having computer instructions stored thereon, wherein the computer instructions are executed by a processor to perform the method according to claim 1.

14. An apparatus comprising one or more processors configured to execute computer instructions to perform the method according to claim 1.

15. The method according to claim 6, further comprising: after determining the target color of the pixel, performing error diffusion on the pixel.

16. The method according to claim 7, further comprising: after determining the target color of the pixel, performing error diffusion on the pixel.

* * * * *

UNITED STATES PATENT AND TRADEMARK OFFICE
CERTIFICATE OF CORRECTION

PATENT NO. : 11,765,305 B2  
APPLICATION NO. : 16/979417  
DATED : September 19, 2023  
INVENTOR(S) : Yanhong Wu et al.

Page 1 of 1

It is certified that error appears in the above-identified patent and that said Letters Patent is hereby corrected as shown below:

In the Specification

At Column 3, Line 19, "the first ratio $r_{11}$ corresponding to white" should read "the first ratio $r_{21}$ corresponding to white--

At Column 5, Line 34, "$r_{33} = r_{32} \times + \frac{V}{V_{max}} + \left(1 - \frac{V}{V_{max}}\right)$" should read --$r_{33} = r_{32} \times \frac{V}{V_{max}} + \left(1 - \frac{V}{V_{max}}\right)$--

At Column 7, Line 7, "$r_{33} = r_{32} \times + \frac{V}{V_{max}} + \left(1 - \frac{V}{V_{max}}\right)$" should read --$r_{33} = r_{32} \times \frac{V}{V_{max}} + \left(1 - \frac{V}{V_{max}}\right)$--

At Column 12, Line 11, "$r_{11} = 0, r_{21} = 1 - \frac{H-180°}{60°}, r_{31} = \frac{H-180°}{60°}$" should read --"$r_{11} = 0, r_{21} = 1 - \frac{H-180°}{60°}, r_{31} = 1 - \frac{H-180°}{60°}$"--

At Column 12, Line 41, "$r_{33} = r_{32} \times + \frac{V}{V_{max}} + \left(1 - \frac{V}{V_{max}}\right)$" should read --$r_{33} = r_{32} \times \frac{V}{V_{max}} + \left(1 - \frac{V}{V_{max}}\right)$--

At Column 21, Line 6, "$r_{11} = 0, r_{21} = 1 - \frac{H-180°}{60°}, r_{31} = 1 - \frac{H-180°}{60°}$" should read --"$r_{11} = 0, r_{21} = \frac{H-180°}{60°}, r_{31} = 1 - \frac{H-180°}{60°}$"--

At Column 21, Line 14, "$r_{11} = 0, r_{21} = \frac{H-300°}{60°}, r_{31} = \frac{H-300°}{60°}$" should read --"$r_{11} = 0, r_{21} = \frac{H-300°}{60°}, r_{31} = 1 - \frac{H-300°}{60°}$"--

Signed and Sealed this  
Seventh Day of May, 2024

Katherine Kelly Vidal  
*Director of the United States Patent and Trademark Office*